May 3, 1960     H. H. BEISSBARTH     2,934,940

MEANS FOR TESTING SHOCK ABSORBERS

Filed July 28, 1955     6 Sheets-Sheet 1

INVENTOR:
H. H. Beissbarth
BY
Richard Geier
ATTORNEYS

May 3, 1960 H. H. BEISSBARTH 2,934,940
MEANS FOR TESTING SHOCK ABSORBERS
Filed July 28, 1955 6 Sheets-Sheet 2

INVENTOR:
H. H. Beissbarth
BY
ATTORNEYS

May 3, 1960 H. H. BEISSBARTH 2,934,940
MEANS FOR TESTING SHOCK ABSORBERS
Filed July 28, 1955 6 Sheets-Sheet 3

INVENTOR:
H.H. Beissbarth
BY
ATTORNEYS

May 3, 1960   H. H. BEISSBARTH   2,934,940
MEANS FOR TESTING SHOCK ABSORBERS
Filed July 28, 1955   6 Sheets-Sheet 4

INVENTOR:
H. H. Beissbarth
BY
Richard J. Geier
ATTORNEYS

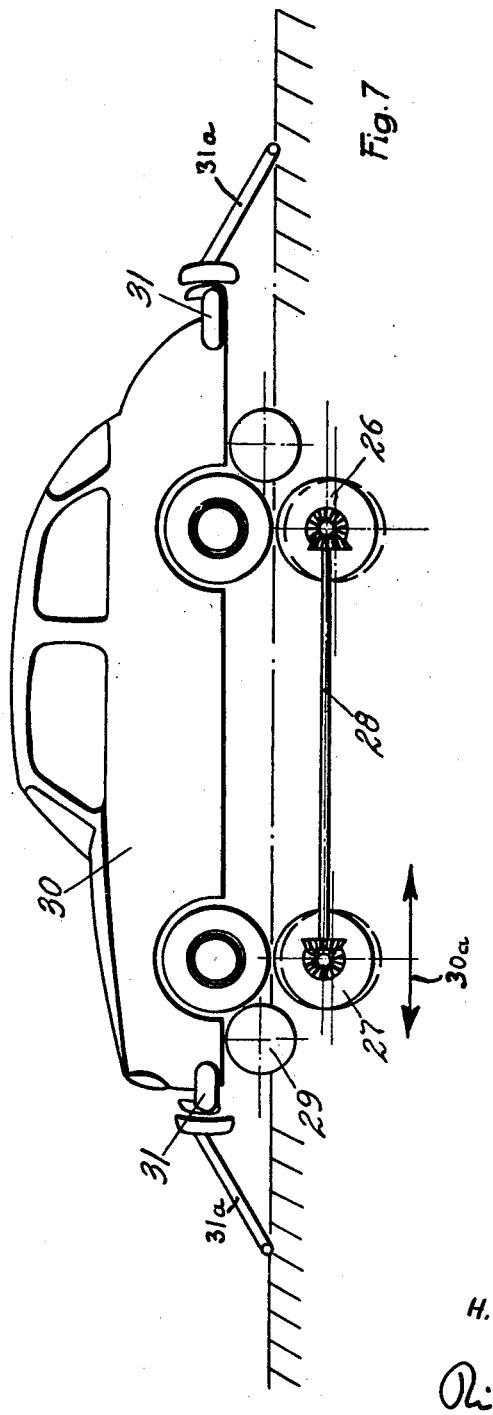

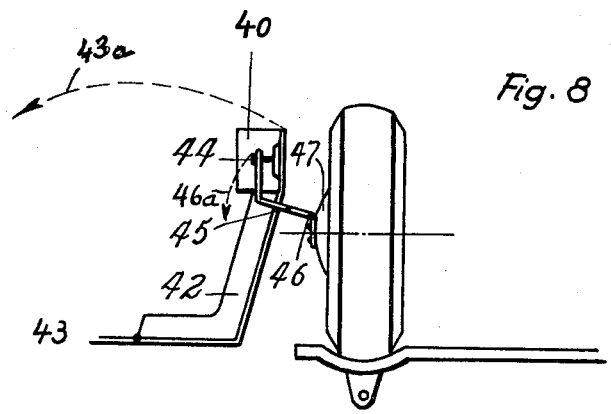
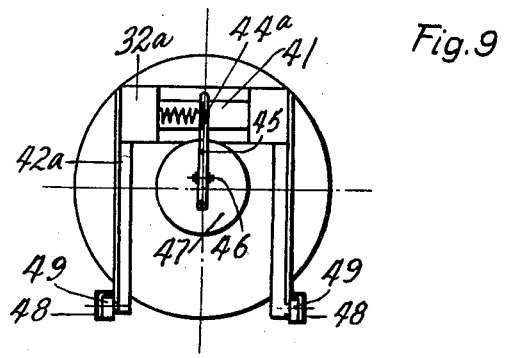

United States Patent Office 2,934,940
Patented May 3, 1960

2,934,940

MEANS FOR TESTING SHOCK ABSORBERS

Hermann Herbert Beissbarth, Munich, Germany

Application July 28, 1955, Serial No. 525,011

Claims priority, application August 4, 1954

4 Claims. (Cl. 73—11)

This invention relates to a means for testing shock absorbers of motor vehicles. Shock absorbers of this type are used to prevent excessive swinging of car springs and the undesirable swinging after the impulse. Since after a certain time period shock absorbers wear out, it is necessary to examine them from time to time and in many instances such examination is compulsory.

Heretofore, for the purpose of carrying out such examination, shock absorbers were usually removed from the vehicle and pressure and tension resistances were examined by hand. In some exceptional cases, machines were used for that purpose. The examination of shock absorbers by hand is obviously insufficiently precise and the removal of shock absorbers from the vehicle consumes time and is expensive.

An object of the present invention is to provide entirely different means for examining shock absorbers so as to determine their effectiveness.

Another object is the provision of a means for testing shock absorbers wherein the testing can be carried out without removing shock absorbers from the vehicle.

Other objects will become apparent in the course of the following specification.

In accordance with the present invention, a wheel of the vehicle and its axle, or only the axle is subjected to oscillations by means of impulses. The impulses are advantageously so arranged that they act perpendicularly or nearly perpendicularly from below upwardly, whereby the wheel along with the axle or the axle alone is subjected to oscillations.

The amplitude of the oscillations which are thus produced serves then as a measure for the effectiveness of the shock absorber belonging to that particular axle. The required value of the amplitude can be determined by means of a standard shock absorber prescribed by the manufacturer.

It is then necessary to select such a frequency of the wheel support that it should be possible to determine the oscillation and damping characteristics of the wheel which is being examined independently from the other three wheels. It is a matter of general knowledge that in an oscillatory system having three masses (one of which, namely, the earth, being infinitely great) and two springs, namely, the axle spring and the tire, there are two natural oscillations, namely, those of the axle and of the vehicle body. The first one of these has a substantially higher frequency than the last one. Since the natural oscillations of the vehicle body depend upon all the wheels and since break oscillations can occur, it is necessary so as to avoid errors to employ impulses exerted upon the wheel or the axle, of a frequency which is above the natural oscillation number of the lift oscillations and break oscillations of the vehicle body. If this procedure is used, the vehicle body will be substantially at rest and only the axle which is being examined will carry out oscillations.

It was determined theoretically and confirmed by experiments that the influence of different shock absorbers is particularly great within the resonance range of the axle oscillations. Therefore, in order to determine the operativeness of a shock absorber, it is advantageous to carry out the testing within the resonance range of the axle oscillations. Since in actual practice this range is not known in advance, it is necessary to pass through the entire range of oscillations from those below the critical range to those above the critical range. The largest amplitudes which occur thereby correspond then to the resonance range of the axle oscillations. Their size is then a completely accurate measurement for determining the operation of a shock absorber attached to the axle in comparison to a standard shock absorber.

In accordance with the present invention, it is also possible to determine noises in the axles and the vehicle body and to eliminate them when the oscillations are carried out slowly.

It is known that strong shock absorbers have a good adhesion to the earth surface as is required in the case of sporting cars, wherein security at high speeds is essential. Weakly operating shock absorbers save the passengers from strong concussions when severe blows are directed from the road bed. The selection of shock absorbers in most cases is thus compromised between these two possible extremes.

In accordance with the present invention, it is possible to examine the operation of the shock absorbers in relation to blows exerted upon the vehicle body from the road bed while driving. This is carried out by subjecting an individual wheel or a plurality of wheels to impulses as the result of which they carry out oscillations, the frequency of which lies below the frequency of the natural oscillations of the axle. In order to provide a comparative value for measurements, this frequency must be always the same and must lie in a range in which the vehicle body already carries out oscillations.

If at a known frequency the amplitudes of the vehicle body are measured in relation to the road bed, then they provide a definite value for the acceleration which is imparted to the vehicle body. If the shock absorbers are differently adjusted, then this acceleration is changed so that the shocks upon the car passengers are also changed to a considerable extent. By the use of measurements carried out by the process of the present invention, it is possible to thus adjust the shock absorbers and in this manner to limit to a minimum the shocks and shakings to which the passengers are subjected from the road bed while driving, whereby the operation of the respective vehicle is considerably improved.

In order to carry out the process of the present invention, it is possible to use an apparatus wherein the vehicle with one of its wheels is placed upon a support such as a plate or the like, which is subjected to oscillations by mechanical or electrical means, for example, an electric motor, a compressed air motor, or any other motor, or by means of a magnet. The device can also be operated by means of a rotary excenter. The wheel support can be made freely swingable or it can be attached to a lever or a swing, the axis of oscillations of which extends preferably parallel to the plane of the wheel. It is also possible to mount the device which transmits or produces the oscillations upon the wheel or upon the axle.

The device can also be so constructed that different lift values of the wheel support can be set. It is particularly advantageous to combine a plurality of such devices with respect to their arrangement and placement into a single examining compound for the testing of shock absorbers; it is also possible to build them into other examining locations or frames for mounting or testing, whereby their locations can be so changed that they can be adapted to the various distances between the wheels of the various vehicles. An arrangement of this nature was found to be advantageous in that then it is necessary to drive the vehicle only once upon the examining platform, whereby the critical range of the axle oscillations can be passed through simultaneously and the amplitudes can be measured upon all wheels. Instead of the swinging plates, it is also possible to use advantageously rollers located under the wheels of the vehicle.

Since the impulses for the examination of the shock absorbers must have approximately sinus-shaped acceleration and deceleration values, it is advisable for that purpose to use eccentrical rollers or rollers of approximately eccentric shape. It is possible to provide under the wheels of an axle, for example, the rear axle, a correspondingly long roller common for the two wheels or two rollers fixed upon the shaft.

This arrangement of the device has the advantage that an extraneous drive of the device can be eliminated, namely, the rollers located under the driving axle of the vehicle can be actuated by the wheels driven by the motor of the vehicle, whereby the eccentric shape of the rollers will impart to the axle oscillations which can extend through the under-critical, the critical or the above-critical range, depending upon the wheel speed (driving speed) of the vehicle. The drive for the roller or rollers which are located under the wheel axis which is not being driven, can be produced, by way of example, by means of a shaft having cone gears and operatively connected with the rollers located under the driven axle, whereby the motor of the motor vehicle is then used to drive the rollers for the other axle.

Since the wheel base of the vehicles to be examined is often different, it is necessary to provide a relative adjustment of the examining rollers for the front axle and the rear axle. In such a construction the vehicle being examined is also driven only once upon the examining platform. The amplitudes in this case, as well as in the case of a device having a plurality of swinging plates or levers, can be measured in a single operation by the critical oscillation number. The examining rollers are provided with locking means so as to lock them firmly when the vehicle is being driven thereon.

Since vehicles with swinging axles have the tendency to jump off the rollers due to the impulses exerted thereon, it is possible to use loosely mounted supporting rollers engaging the wheels of the vehicle so as to prevent the vehicles from moving forwardly or rearwardly.

The invention will appear more clearly from the following detailed description when taken in connection with the accompanying drawings showing by way of example preferred embodiments of the inventive idea.

In the drawings:

Figure 7 is a side view illustrating excentrical rollers imparting oscillations to the wheels of an automobile.

Figure 8 is a side view illustrating a measuring device.

Figure 9 is a front view illustrating a somewhat different measuring device.

Figure 1:
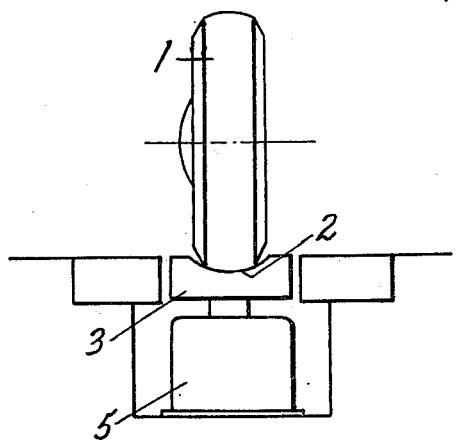
Figure 1 is a diagrammatic side view illustrating a plate supporting the wheel of a vehicle.

Figure 1 shows a wheel 1 of an automobile or the like which is placed upon a recess 2 of a plate 3. The plate 3 is oscillated by any suitable motor 5.

It is apparent that due to this arrangement the wheel 1 along with its axis is oscillated by impulses exerted vertically from below. The amplitude of these oscillations serves then as a measurement for the operation of the shock absorber. As already stated, the extent of the oscillations must include the critical range.

Figure 2:
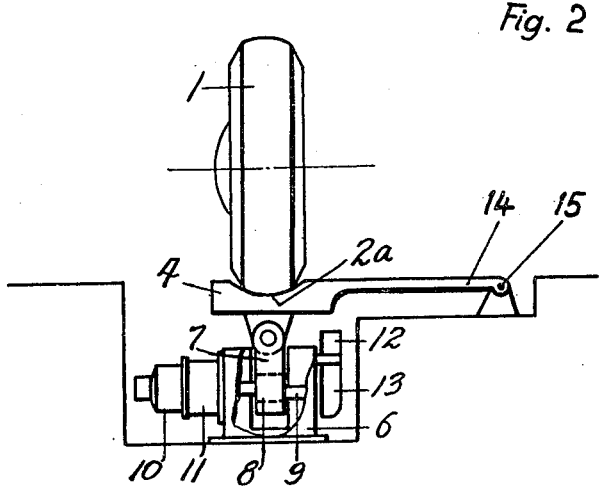
Figure 2 is a diagrammatic side view illustrating a swing supporting the wheel of a vehicle.

Figure 2 shows a wheel 1 located in a recess 2a of a swing 4. In this construction the support 4 is actuated by a slide 7 located in a casing 6. An excenter 8 is adjustably mounted upon the shaft 9 which is driven from a motor 10 through a gear box 11; the speed of the motor 10 may be adjusted by any suitable means not shown in the drawings. The excenter 8 can be adjusted by means of an auxiliary motor 12 connected with a gear box 13. The swing 4 has an elongated arm or plate 14 which is carried upon a pivot 15. The operation of this device is the same as that previously described.

Figure 3:
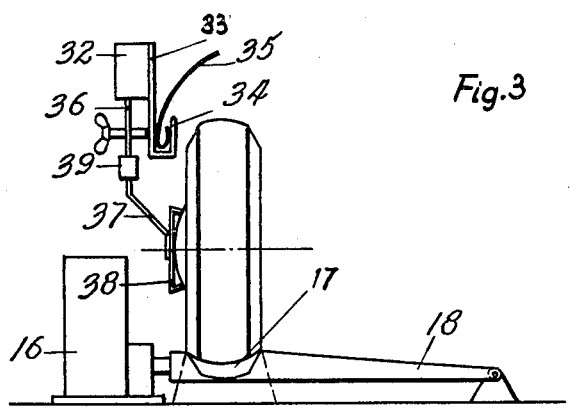
Figure 3 illustrates diagrammatically and in side view a movable measuring device.
Figure 4:
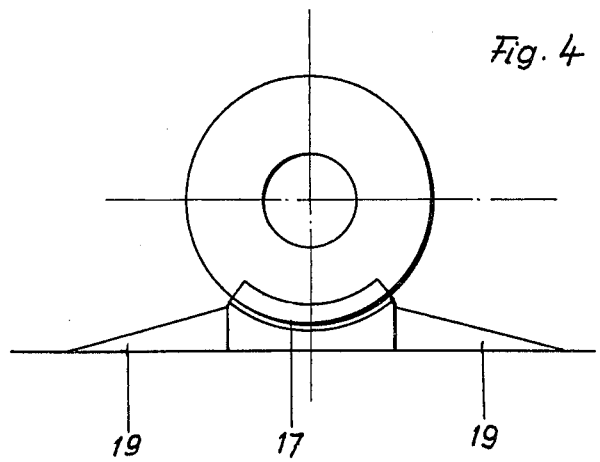
Figure 4 is a front view of the device shown in Figure 3.

The devices shown in Figures 1 and 2 are all imbedded in the floor. Figures 3 and 4 show, on the other hand, a device which may be placed upon the floor and which may be transported from place to place. The device includes a swing 18 having a recess 17 for the wheel. The swing 18 is operated by a suitable drive 16. Inclined wedge shaped supports 19 are located on opposite sides of the recess 17 to make it easier to drive the wheel upon the recess 17 and to remove it therefrom.

The device for measuring the amplitude of axle oscillations, shown in Figure 3, includes an indicator 32 which is attached to a plate 33. Screw claps 34 are used to connect it to the fender 35 of the vehicle which is being examined. A rod transmission 36 connects the instrument 32 with a rod 37 by means of a clamping sleeve 39. The rod 37 is connected with a device 38 which is similar to a hub cap and which is attached to the wheel.

It is apparent that this instrument can be used conveniently in the above described manner to determine the operation of a shock absorber.

Figure 5:
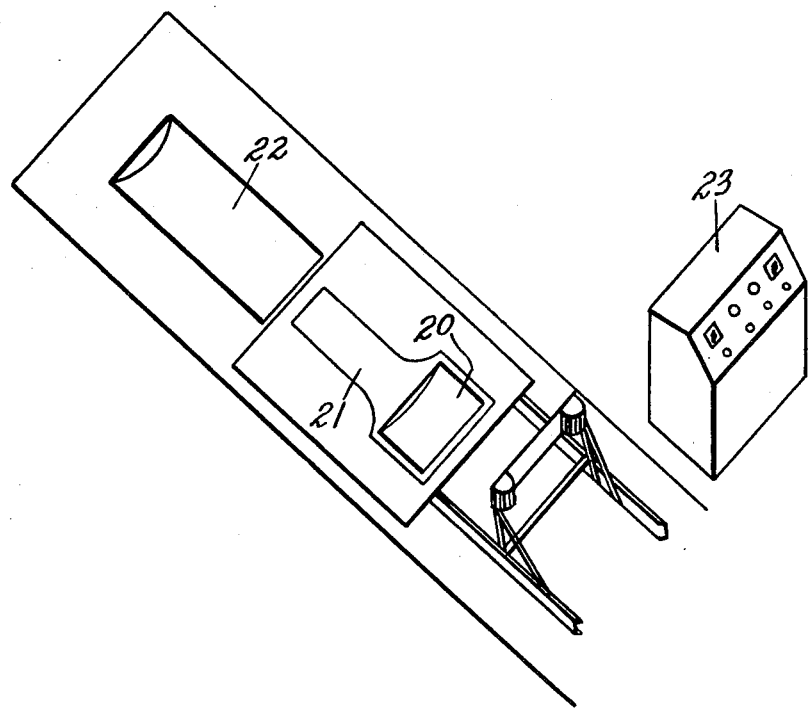
Figure 5 is a perspective view illustrating a complete examining aggregate.

Figure 5 illustrates a complete installation for examining vehicles. One wheel of the vehicle is placed in a recess 20 of a swinging support 21 while the other wheel is located in the immovable recess 22. The operator stands in front of the instrument board and steering panel 23. It is thus apparent that the examination can be conducted quickly and easily.

Figure 6:
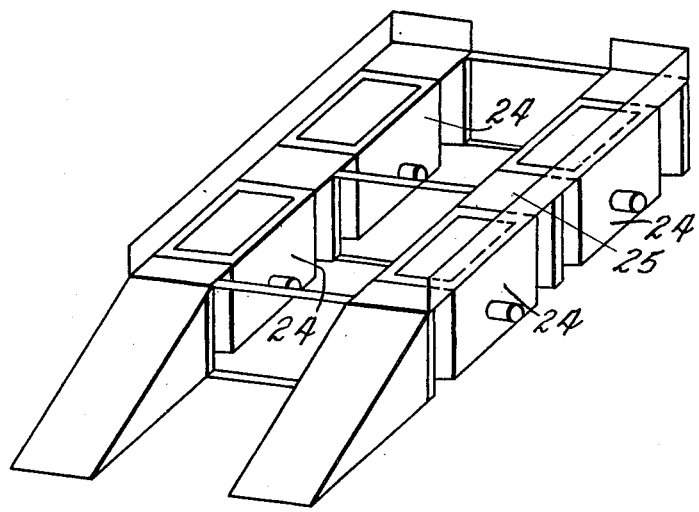
Figure 6 is a perspective view showing a testing platform combined with the devices of the present invention.

A complete platform for examining a vehicle is also shown in Figure 6. This platform consists of rails 25 adapted to receive four wheels of the vehicle. These wheels are supported by oscillating devices 24 constituting the subject matter of the present invention. The devices 24 may be operated and the amplitude of the oscillations observed in the previously described manner.

Figure 7 illustrates a device wherein excentrical rollers 26 and 27 are used for the purpose of imparting oscillations to the wheels of a vehicle 30. The rollers 26 and 27 are interconnected by means of conical gears and a shaft 28. In this device the motor of the vehicle may be operated to drive the rear wheels which will drive the roller 26. The rotation of the roller 26 will be transmitted by the shaft 28 to the roller 27. Loosely mounted supporting rollers 29 are used as supports for the wheels of the vehicle. Resilient supports 31a engage buffer bars 31 of the vehicle 30. The vehicle 30 may be shifted in the longitudinal direction, as designated by the arrow 30a, between the rollers 29 and the supports 31a.

Figure 8 illustrates another measuring device comprising an indicator 40 provided with a scriber 44. A rod 45 carries the scriber 44 and is attached to the cap 47 serving as the hub cap of the wheel. The instrument 40 is carried by a support 42 and can be swung about a pivot 43, as indicated by the arrow 43a. Similarly the scriber 44 may be swung about a pivot 46 as indicated by the arrow 46a.

Figure 9 illustrates a somewhat similar arrangement which includes a scriber 44 writing upon a paper strip 41 which moves from a container 32a. The scriber 44 is connected to the rod 45 and is swingable about a pivot 46 attached to the cap 47 in the manner shown in Figure 8. However, in this construction the device is carried upon supports 42a provided with rollers 49. These rollers are movable in rails 48. It is apparent that due to this arrangement the frame 42a carrying the instrument may be moved toward or away from the wheel.

It is further apparent that the examples shown above have been given solely by way of illustration and not by way of limitation and that they are subject to many variations and modifications. All such variations and modifications are to be included within the scope of the present invention.

What is claimed is:

1. An apparatus for testing shock absorbers for motor vehicles, comprising a wheel supporting member, means connected with said member for imparting to said member oscillatory up-and-down movements and a measuring device comprising a cap, means attaching said cap to the wheel carried by the wheel supporting member, an indicator, flexible and swingable means operatively connecting said cap with said indicator, resilient means supporting said indicator adjacent said wheel, and means moving said resilient means toward and away from said wheel.

2. An apparatus for testing shock absorbers for motor vehicles, comprising a wheel supporting member, means connected with said member for imparting to said member oscillatory up-and-down movements and a measuring device comprising a cap, means attaching said cap to the wheel carried by the wheel supporting member, an indicator, and means operatively connecting said cap with said indicator.

3. A measuring device in accordance with claim 2, comprising means attaching said indicator to the fender of the vehicle carried by the wheel supporting member.

4. An apparatus for testing a shock absorber of a motor vehicle, said apparatus comprising a swing having a recess for receiving a wheel of the vehicle, a drive connected with said swing for actuating the same, a plate, an indicator carried by said plate, screw claps connected with said plate for connection to the fender of the vehicle, a cap-like device for attachment to the wheel of the vehicle, a rod transmission connected to said indicator, a rod connected to said device, and a clamping sleeve connecting said rod transmission with said rod.

References Cited in the file of this patent

UNITED STATES PATENTS

| 1,511,818 | Moore | Oct. 14, 1924 |
| 1,891,613 | Widney | Dec. 20, 1932 |
| 2,022,340 | Deane | Nov. 26, 1935 |
| 2,133,843 | Berry | Oct. 18, 1938 |
| 2,799,158 | Federspiel | July 16, 1957 |

FOREIGN PATENTS

| 729,255 | France | Apr. 25, 1932 |